(12) United States Patent
Chen

(10) Patent No.: US 7,679,489 B2
(45) Date of Patent: Mar. 16, 2010

(54) AUTO ANTI-THEFT SYSTEM WITH DOOR-MOUNT WIRELESS REMOTE-CONTROL PUSHBUTTON

(76) Inventor: Tse Hsing Chen, 14Fl., No. 736 Chung-Cheng Rd., Chung-Ho City, Taipei Hsien (TW) 23511

( * ) Notice: Subject to any disclaimer, the term of this patent is extended or adjusted under 35 U.S.C. 154(b) by 380 days.

(21) Appl. No.: 11/699,408

(22) Filed: Jan. 30, 2007

(65) Prior Publication Data

US 2008/0180232 A1 Jul. 31, 2008

(51) Int. Cl.
*B60R 25/10* (2006.01)

(52) U.S. Cl. .............. 340/426.1; 340/426.13; 340/426.28; 340/426.36; 340/500; 340/539.11; 340/541

(58) Field of Classification Search .......... 340/426.1, 340/426.13, 426.17, 426.28, 426.36, 500, 340/539.1, 539.11, 540, 541, 542
See application file for complete search history.

(56) References Cited

U.S. PATENT DOCUMENTS

| | | | |
|---|---|---|---|
| 4,794,268 A * | 12/1988 | Nakano et al. ............. 307/10.2 |
| 5,121,098 A * | 6/1992 | Chen .......................... 340/457 |
| 5,319,364 A * | 6/1994 | Waraksa et al. ............ 340/5.64 |
| 6,853,853 B1 * | 2/2005 | Van Wiemeersch et al. ...... 455/569.2 |
| 7,106,171 B1 * | 9/2006 | Burgess ..................... 340/5.72 |
| 7,359,696 B2 * | 4/2008 | Tanaka et al. ............... 455/411 |
| 2006/0244312 A1 * | 11/2006 | Ogino et al. ................. 307/9.1 |

* cited by examiner

*Primary Examiner*—Toan N Pham
*Assistant Examiner*—Kerri McNally
(74) *Attorney, Agent, or Firm*—Bacon & Thomas PLLC

(57) ABSTRACT

An auto anti-theft system with door-mount wireless remote-control pushbutton includes a main controller installed in a car for controlling the operation of the anti-theft system; a remote controller being carried by a user for code matching; and a small-size wireless remote-control pushbutton, which includes a coupling section for mounting the pushbutton to a car of any version or brand on or near a car door, such as on a door handle, a keyhole, a door surface, or a door window. The wireless remote-control pushbutton, the main controller, and the remote controller cooperate with one another to provide the functions of releasing and enabling the anti-theft system directly beside the car without pressing the remote controller button, making the anti-theft system a humanized design.

9 Claims, 6 Drawing Sheets

AUTO ANTI-THEFT SYSTEM WITH DOOR-MOUNT WIRELESS REMOTE-CONTROL PUSHBUTTON

FIELD OF THE INVENTION

The present invention relates to an auto anti-theft system, and more particularly to an auto anti-theft system with door-mount wireless remote-control pushbutton, which can be used with cars of all versions from different brands and easily installed without the need of drilling holes or wiring on a car door, and allows a user to release or enable the anti-theft system directly beside the car.

BACKGROUND OF THE INVENTION

An automobile is an important traffic means in the modern society. It is a good thing to buy and own a new car. However, almost all the car owners have the bothersome problem of guarding the car against theft. Currently, there are various types of auto anti-theft systems available in the market, and these anti-theft systems generally produce a deterrent effect by emitting a warning sound at the instant the car is invaded by a thief. With the development in electronic technology, the new generation of auto anti-theft systems provides diversified functions, such as interrupting fuel supply and/or disconnecting power supply when the car is invaded. Some auto anti-theft systems even include Bluetooth signal transmission function or satellite positioning function to completely stop theft.

The currently available auto anti-theft systems are different in their performance and effect. The auto anti-theft systems and remote-controlled power locks in early stages are generally controlled using a remote controller. However, a handle-mount pushbutton has been developed as part of an original anti-theft system for some advanced cars. A user may conveniently push the pushbutton on the door handle when he or she grips the door handle to open or close the car door to release or enable the auto anti-theft system without pressing the remote controller which put in the pocket. The auto anti-theft system with the handle-mount pushbutton is therefore a convenient, advanced, and humanized design.

With the auto anti-theft system having a handle-mount pushbutton, the user needs only to put the remote controller in a pocket without pressing it. When the user wants to get on his or her car, he or she needs only to push the pushbutton on the door handle, and the auto anti-theft system automatically wakens up a main controller in the car to send a signal and proceed with code matching with the remote controller in the user's pocket or carried by the user. When the code matching is successful, the anti-theft system is automatically released and the car door is unlocked. On the other hand, when the user gets off the car and closes the car door, he or she needs only to push the pushbutton on the door handle to enable the auto anti-theft system. It is not necessary to take out and operate the remote controller.

When it is desired to additionally mount this type of anti-theft system on a car, the car door or the door handle must be drilled for mounting the pushbutton, or a new handle must be used to replace the old one. Moreover, since there are too many different brands and versions of cars, it is uneconomical to develop a large quantity of handle with pushbuttons for each different car. And, most car owners are not willing to drill holes on their new cars for mounting the pushbutton.

It is therefore tried by the inventor to develop an auto anti-theft system with door-mount wireless remote-control pushbutton that may be mounted on all types of cars without the need of drilling holes or wiring the pushbutton to the control unit.

SUMMARY OF THE INVENTION

A primary object of the present invention is to provide an auto anti-theft system with door-mount wireless remote-control pushbutton, which can be used with cars of all versions from different brands and easily installed without the need of drilling holes, wiring, or replacing a door handle.

Another object of the present invention is to provide an auto anti-theft system with door-mount wireless remote-control pushbutton, which is a humanized design allowing a user to release or enable the anti-theft system directly beside a car.

To achieve the above and other objects, the auto anti-theft system with door-mount wireless remote-control pushbutton according to the present invention includes a main controller installed in a car for controlling the operation of the anti-theft system; a remote controller being carried by a user for code matching; and a small-size wireless remote-control pushbutton, which includes a coupling section for removably mounting to a car of any version on or in the vicinity of the car door, such as on a door handle, a keyhole, a door surface, or a door window. The wireless remote-control pushbutton, the main controller, and the remote controller cooperate with one another to provide the functions of releasing and enabling the anti-theft system directly beside the car without pressing the remote controller button, making the anti-theft system a humanized design.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
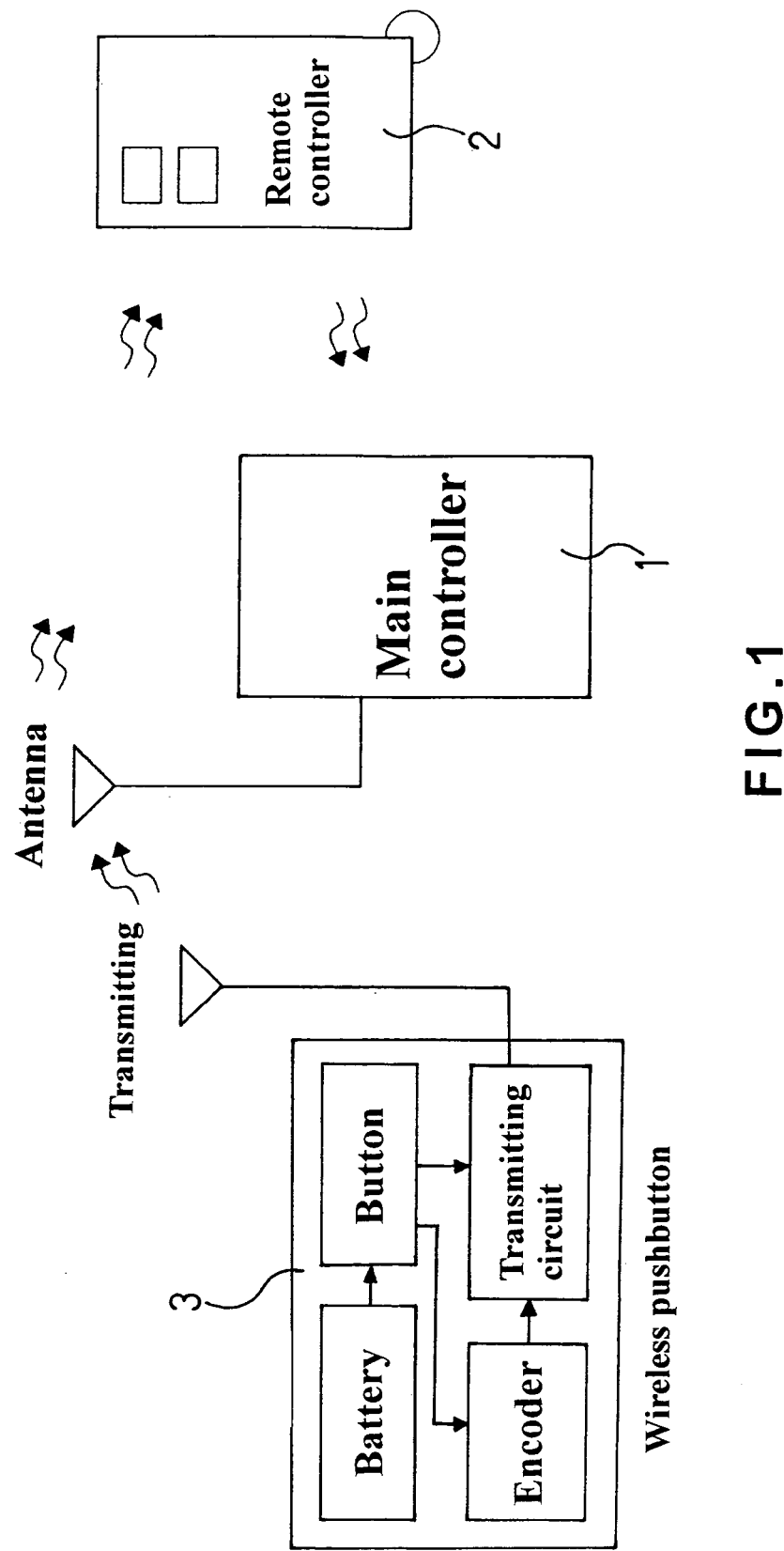
FIG. 1 is a block diagram of the auto anti-theft system according to a preferred embodiment of the present invention.

Please refer to FIG. 1 that is a block diagram of an auto anti-theft system with door-mount wireless remote-control pushbutton according to a preferred embodiment of the present invention. As shown, the auto anti-theft system of the present invention includes a main controller 1 mounted in a car for controlling the operation of the auto anti-theft system; a remote controller 2 normally carried by a user for code matching; and a small-size wireless remote-control pushbutton 3 mounted on or near a car door.

Figure 2:
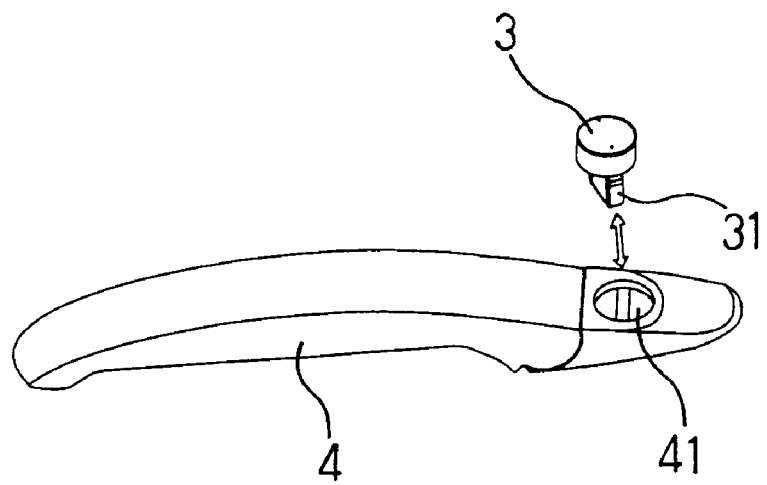
FIG. 2 is an exploded perspective view showing a first type of door-mount wireless remote-control pushbutton for the auto anti-theft system of the present invention.
Figure 3:
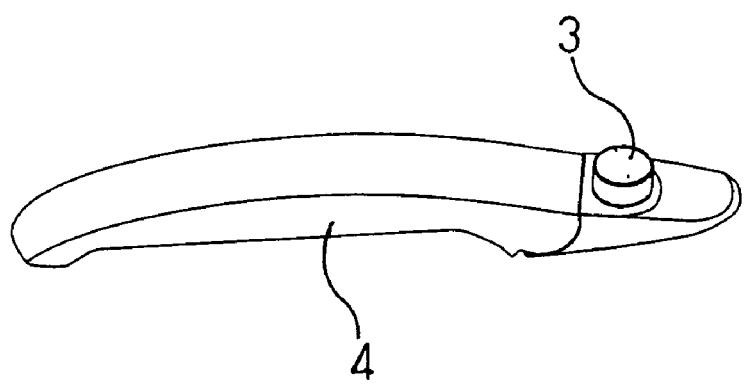
FIG. 3 is an assembled view of FIG. 2.

FIGS. 2 to 6 show some different types of the small-size wireless remote-control pushbutton 3. FIGS. 2 and 3 are exploded and assembled perspective views, respectively, of a first type of the small-size wireless remote-control pushbutton 3 having a one-legged coupling section 31, which is adapted to insert into a keyhole 41 on a door handle 4. Since most currently available cars have a remotely controllable door lock, the keyhole 14 on the door handle 4 is rarely used. Therefore, the very small wireless remote-control pushbutton 3 with one-legged coupling section 31 may be conveniently mounted to the door handle 4 by inserting the one-legged coupling section 31 into the keyhole 41, and be quickly dismounted when it is necessary to use the keyhole 41.

Figure 4:
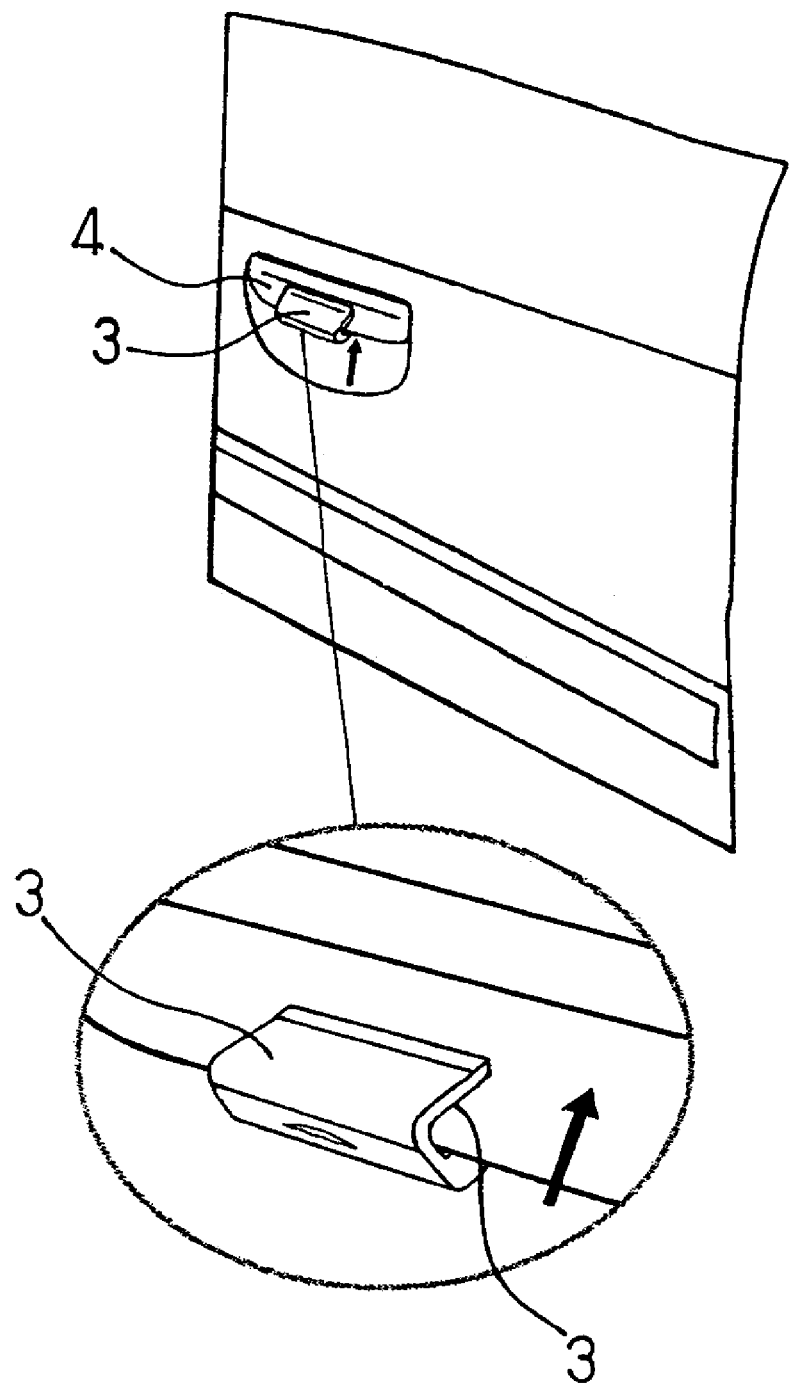
FIG. 4 is a perspective view showing a second type of door-mount wireless remote-control pushbutton for the auto anti-theft system of the present invention suitable for mounting to a door handle.

FIG. 4 shows a second type of the small-size wireless remote-control pushbutton 3 having a two-legged coupling section 31, which is suitable for clamping to a flat door handle 4.

Figure 5:
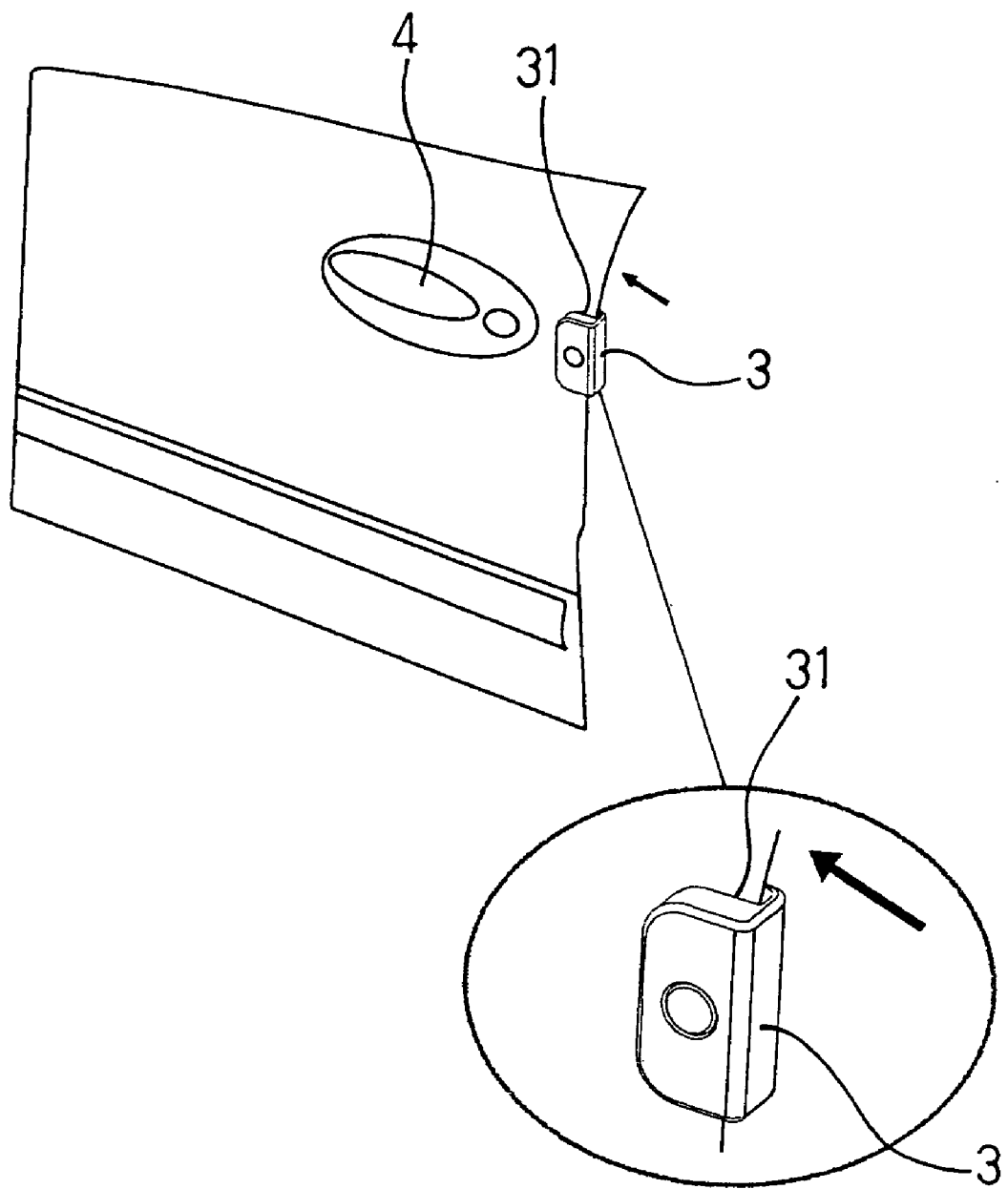
FIG. 5 is a perspective view showing a third type of door-mount wireless remote-control pushbutton for the auto anti-theft system of the present invention suitable for mounting to a door edge.

FIG. 5 shows a third type of the small-size wireless remote-control pushbutton 3 having a two-legged coupling section 31, which is suitable for clamping to a door edge.

Figure 6:
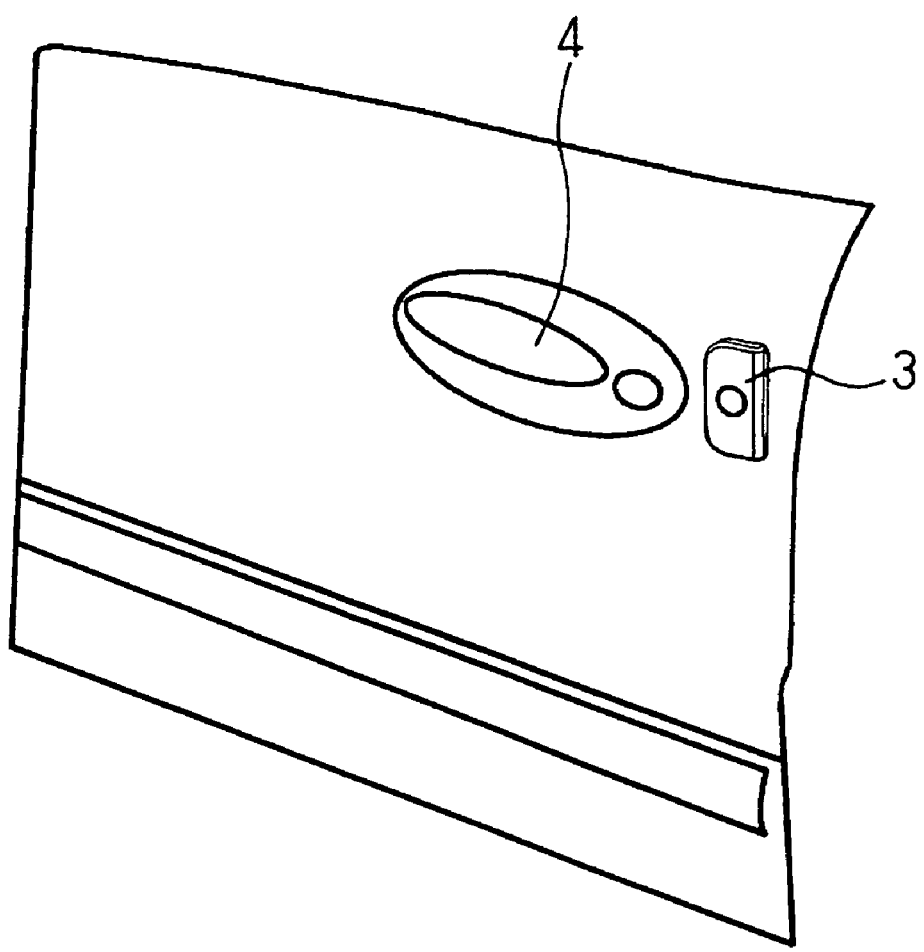
FIG. 6 is a perspective view showing a fourth type of door-mount wireless remote-control pushbutton for the auto anti-theft system of the present invention suitable for mounting to a door surface near the door handle.

FIG. 6 shows a fourth type of the small-size wireless remote-control pushbutton 3 that does not include any coupling section but may be provided on a back with an adhesive for directly bonding to the door handle or on a door surface near the door handle.

Since the small-size wireless remote-control pushbutton 3 is a separate member designed for mounting or attaching to the door handle 4, the door edge, or the door surface, it is applicable to all versions of different brands of cars. The small-size wireless remote-control pushbutton 3 may be conveniently installed without the need of drilling hole, wiring, or replacing door handle.

In a conventional auto anti-theft system, a remote controller carried by a user is normally set to automatically send out a signal at intervals of a few seconds. When the remote controller is located near the car, and a main controller installed in the car receives a correct code from the remote controller, the anti-theft system is automatically released to unlock the car door. And, when the remote controller is located beyond an effective receiving range of the main controller, the anti-theft system is automatically enabled to lock the car door. However, when the remote controller is located at a critical signal receiving distance of the main controller, the main controller tends to be falsely operated and switches between releasing and enabling the anti-theft system quickly, causing inconveniences to the user or risks in safety to the car.

In the auto anti-theft system of the present invention, while the remote controller 2 is set to automatically send signals at intervals of a few seconds, the main controller 1 is set to proceed with code matching when it receives a signal, and then hold on for a few seconds when the code is found matched. The holding time set for the main controller 1 is preferably longer than the signal sending interval set for the remote controller 2, so that a user may get on the car without the need of waiting for the next signal sent to the main controller 1. In this manner, when the user moves into a range within which the main controller 1 can effectively receive a signal, he or she has to push the wireless remote-control pushbutton 3 to automatically release the anti-theft system and unlock the car door. And, when the user gets off the car, he or she may push the wireless remote-control pushbutton 3 before leaving the car, so as to lock the door and enable the anti-theft system. Therefore, the auto anti-theft system with the wireless remote-control pushbutton according to the present invention is very convenient and safe for use.

Alternatively, the main controller 1 of the auto anti-theft system of the present invention may be set to be wakened up by pushing the wireless remote-control pushbutton 3, so as to send a signal that has an effective range of only a few meters from the car. When the remote controller 2 carried by the user receives the signal sent by the main controller 1, it sends out a code to the main controller 1 for code matching. When the code is found matched, the anti-theft system is immediately released. And, when the user gets off the car and pushes the wireless remote-control pushbutton 3, the car door is locked and the anti-theft system is enabled.

It is also possible to set a master control code for the small-size wireless remote-control pushbutton 3 to control the unlocking of all car doors and the releasing of all setting for the anti-theft system.

Since the small-size wireless remote-control pushbutton 3 is designed for mounting to a door handle 4 or a door edge or on a door surface near the door handle, a user may conveniently push the wireless remote-control pushbutton 3 when he or she grips the door handle 4 to open the door, and a signal is wirelessly sent by the pushbutton 3 to waken up the main controller 1, so that the main controller 1 sends a signal to check the code sent by the remote controller 2 carried by the user. When the code is found correct by the main controller 1, the door is unlocked and the anti-theft system is released. Similarly, when the user gets off the car and closes the door, he or she needs only to push the wireless remote-control pushbutton 3 on or near the door handle 4, and a signal is sent by the pushbutton 3 to the main controller 1 in the car, so that main controller 1 locks the door and enables the anti-theft system. Therefore, the wireless remote-control pushbutton 3 is a humanized design for cooperating with the main controller 1 and the remote controller 2 to provide the functions of releasing and enabling the auto anti-theft system directly beside the car without the need of operating the remote controller.

Figure 7:
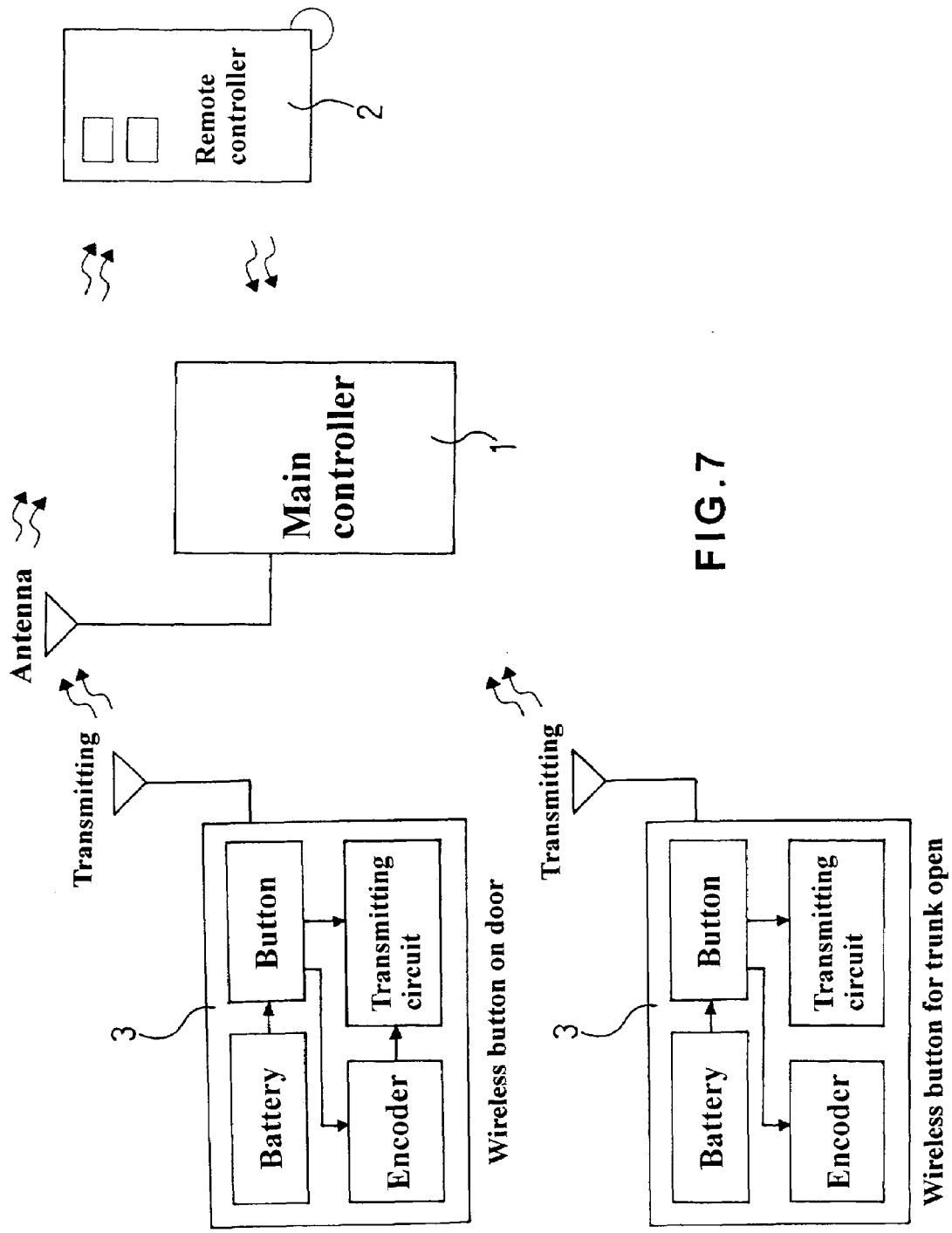
FIG. 7 is a block diagram of an auto anti-theft system according to another embodiment of the present invention.

FIG. 7 is a block diagram of an auto anti-theft system with wireless remote-control pushbutton according to another embodiment of the present invention. As shown, the small-size wireless remote-control pushbutton 3 may also be mounted on or near a trunk lid handle 4. When the trunk-mount pushbutton 3 is pushed, a trunk signal is sent to waken up the main controller 1 to send a signal to the remote controller 2 carried by a user for code matching. When the code is found correct, the trunk lid is unlocked and the anti-theft system is released. When the trunk lid is closed, the trunk-mount pushbutton 3 may be pushed to lock the trunk lid and enable the anti-theft system.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An automobile anti-theft system, comprising:
   a main controller mounted in an automobile for controlling an operation of said automobile anti-theft system;
   a remote controller normally carried by a user for code matching with the main controller to unlock a door of the automobile; and
   a small-size wireless remote-control pushbutton mounted on or near an automobile door, and configured to activate at least one of said main controller and said remote controller to perform said code matching;

wherein said small-size wireless remote-control pushbutton includes a one-legged coupling section for inserting into a keyhole on a door handle of the automobile.

2. The automobile anti-theft system as claimed in claim 1, wherein said small-size wireless remote-control pushbutton includes a two-legged coupling section for clamping to any of a flat door handle and a door edge.

3. The automobile anti-theft system as claimed in claim 1, wherein adhesive is provided at a back side of said small-size wireless remote-control pushbutton for mounting to an automobile door surface.

4. The automobile anti-theft system as claimed in claim 1, wherein said remote controller carried by the user is set to automatically send a signal at intervals, and said signal sent by said remote controller having a limited effective range; and said main controller is set to delay when the signal sent by said remote controller is received and checked as correct by said main controller; the delay time of said main controller being longer than the signal sending interval of said remote controller; whereby when the user is in a vicinity of the automobile, said wireless remote-control pushbutton must be pushed for said main controller to unlock the automobile door and release the anti-theft system; and when the user leaves the automobile and closes the automobile door, said main controller may be wakened up to lock the automobile door and enable the anti-theft system simply by pushing said wireless remote-control pushbutton without pressing a remote controller button.

5. The automobile anti-theft system as claimed in claim 1, wherein said main controller is set to be wakened up to send a signal having a limited effective range when the user is in a vicinity of the automobile and pushes said wireless remote-control pushbutton, and said remote controller is set to send a code to said main controller for code matching as soon as said remote controller receives said signal sent by said main controller, and said main controller immediately unlocks the automobile door and releases said anti-theft system when said code sent by said remote controller is checked as correct; and wherein said main controller is set to be wakened up to lock the automobile door and enable said anti-theft system when the user gets off the automobile, closes the door, and pushes said wireless remote-control pushbutton.

6. The automobile anti-theft system as claimed in claim 1, wherein a master control code is set for said small-size wireless remote-control pushbutton, so that said wireless remote-control pushbutton may control locking and unlocking of all doors of the automobile, and releasing and enabling of said anti-theft system.

7. The automobile anti-theft system as claimed in claim 1, wherein a trunk code is set for said small-size wireless remote-control pushbutton, so that said wireless remote-control pushbutton may control locking and unlocking of a trunk lid, and releasing and enabling of said anti-theft system.

8. An automobile anti-theft system, comprising:
a main controller mounted in an automobile for controlling an operation of said automobile anti-theft system;
a remote controller normally carried by a user for code matching; and
a small-size wireless remote-control pushbutton mounted on or near an automobile door;
wherein said small-size wireless remote-control pushbutton includes a one-legged coupling section for inserting into a keyhole on a door handle of the automobile.

9. An automobile anti-theft system, comprising:
a main controller mounted in an automobile for controlling an operation of said auto anti-theft system;
a remote controller normally carried by a user for code matching; and
a small-size wireless remote-control pushbutton mounted on or near an automobile door;
wherein said remote controller carried by the user is set to automatically send a signal at intervals, and said signal sent by said remote controller having a effective range; and said main controller is set to delay when the signal sent by said remote controller is received and checked as correct by said main controller; the delay time of said main controller being longer than the signal sending interval of said remote controller; whereby when the user is in a vicinity of the automobile, said wireless remote-control pushbutton must be pushed for said main controller to unlock the automobile door and release the anti-theft system; and when the user leaves the automobile and closes the automobile door, said main controller may be wakened up to lock the automobile door and enable the anti-theft system simply by pushing said wireless remote-control pushbutton without pressing a remote controller button.

* * * * *